United States Patent [19]

Woods et al.

[11] 3,870,814

[45] Mar. 11, 1975

[54] IMAGE POSITIONING APPARATUS AND METHOD

[75] Inventors: Thomas H. Woods, Middletown; William M. Voss, Martin, both of Ohio

[73] Assignee: The Mosler Safe Company, Hamilton, Ohio

[22] Filed: Sept. 11, 1973

[21] Appl. No.: 396,190

[52] U.S. Cl. .............................. 178/7.2, 178/DIG. 1

[51] Int. Cl. .............................................. H04n 5/38

[58] Field of Search ......... 178/7.2, DIG. 1, DIG. 36, 178/6.8

[56] References Cited

UNITED STATES PATENTS

| | | | |
|---|---|---|---|
| 3,621,130 | 11/1971 | Habbal | 178/7.2 |
| 3,749,830 | 7/1973 | Blitchington | 178/DIG. 1 |
| 3,814,845 | 6/1974 | Hurlbrink, III et al. | 178/DIG. 36 |

*Primary Examiner*—Richard Murray
*Attorney, Agent, or Firm*—Wood, Herron & Evans

[57] ABSTRACT

A positioning control circuit for locating a document image frame with respect to the scanning field of a camera in which the video and sync signals output from the camera are processed to determine the existence of a document reference mark within the camera field, as well as the coordinate location relative to the camera field, of a specific point within the reference mark. The actual coordinate position of the specific point within the reference mark is compared with a desired coordinate location, and the document image repositioned relative to the camera field in response to any difference existing between the actual and desired coordinate positions. This process is repeated during each successive field scanning operation until the mark coincides with the desired position, whereupon further signal processing and document image repositioning is terminated.

8 Claims, 5 Drawing Figures

IMAGE POSITIONING APPARATUS AND METHOD

This invention relates to a method and apparatus for properly registering a document image with respect to the scanning field of a camera. The invention herein described was made in the course of or under a contract or subcontract thereunder with the Department of the Air Force.

In the area of data storage, documents containing pictorial and printed information are often stored utilizing microfilm technology. In one form of microfilm technology, known as a microfiche, a tab card size photographic record is utilized which contains a sizable number, for example, 40, microfilmed document images. Typically the individual microfilmed document images are arranged in a grid or matrix configuration, for example, in a 10 by 4 pattern. Ideally, each document image is associated with a different grid or matrix cross-point and centered with respect to it. In practice, however, due to misalignment which occurs in the course of producing the microfilmed document images on the microfiche, a document image may be misaligned horizontally and/or vertically with respect to its associated grid cross-point. When misalignment occurs, and the microfiche is positioned by automatic means in response to an address corresponding to the grid cross-point of a specified document image to place the image in the field of a camera for viewing purposes, the specified document image so positioned will be out of register with the camera viewing field. Such misregistry occurs because, in positioning the desired document image with respect to the camera field, the microfiche, and hence the desired document image, is positioned relative to the grid cross-point associated with the desired document image (with respect to which the image is theoretically centered) rather than with respect to the document image itself.

It has been an objective of this invention to provide a method and apparatus for automatically positioning a document image with respect to the field of view of a camera irrespective of horizontal and/or vertical misalignment of the document image relative to the cross-point of a grid pattern with respect to which the document image is presumably located. This objective has been accomplished, in accordance with certain of the principles of this invention, by providing a sensible reference mark of predetermined length and width on the document image to be positioned which is then scanned with a conventional TV camera. The video and sync signals output from the camera during each field scanning operation are processed to determine that the entire mark has been sensed in the course of the camera field scanning cycle, as well as the actual coordinate location of a specified point within the mark. A comparison is made, each camera field scanning cycle, of the actual coordinate position of the specified point within the mark against the desired coordinate location associated with proper registry of the document image relative to the camera viewing field, and repositioning signals generated in response to differences therebetween which then drive document repositioning means. When the actual and desired coordinate positions of the specified point within the reference mark contained in the document image coincide, further processing of the camera video and sync signals during successive camera field scanning cycles is terminated.

In a preferred form of this invention, a clock pulse generator is utilized having a frequency substantially greater than that of the line scanning frequency of the viewing camera such that for each line scan made by the camera a plurality of clock pulses are generated. By utilizing a counter which is reset at the beginning of each line scan, the clock pulses occurring between the beginning of a line scan and the sensing of the specific point within the reference mark can be counted and used as a measure of the coordinate position, in terms of clock pulses, of the document image with respect to a vertical margin of the camera viewing field. Similarly, by providing a counter which is reset at the beginning of each camera field scanning operation, the number of horizontal line scans between the beginning of a field scanning operation and detection of the specified point within the mark can be counted and used as a measure of the coordinate location, in terms of line scans, of the document image with respect to another margin of the camera viewing field. The clock pulse and horizontal line scan counts, which correspond to the actual coordinate location of the specified point within the mark relative to the camera viewing field, and hence to the position of the document image with respect to the camera field, can be compared against desired coordinate positions and differences therebetween used to generate document repositioning signals.

The document image repositioning apparatus and method of this invention are highly reliable and afford very accurate positioning. Because the reference mark has a predetermined length and width, both of which are used as criteria for determining that the reference mark has been sensed, the invention is relatively insensitive to extraneous marks which may appear on the document image, providing a relatively high degree of discrimination in reference mark sensing. Additionally, and by virtue of the fact that a specified point within the reference mark is utilized in determining the actual coordinate location of the document, a document image positioning scheme having a relatively high degree of positioning resolution is provided. Finally, by virtue of the scan line and clock pulse counting techniques used to determine the actual coordinate position of the reference mark, a document image positioning system is provided in which the video and sync signals normally output from a T.V. camera are used to both view the document image via a TV monitor, as well as to provide the inputs to the positioning circuit. This eliminates the need for a special purpose document image transducer to provide positioning information as to the location of the document image relative to the camera viewing field.

These and other advantages and objectives of the invention will become more readily apparent from a detailed description of a preferred embodiment of the invention taken in connection with the drawings in which.

Figure 1:
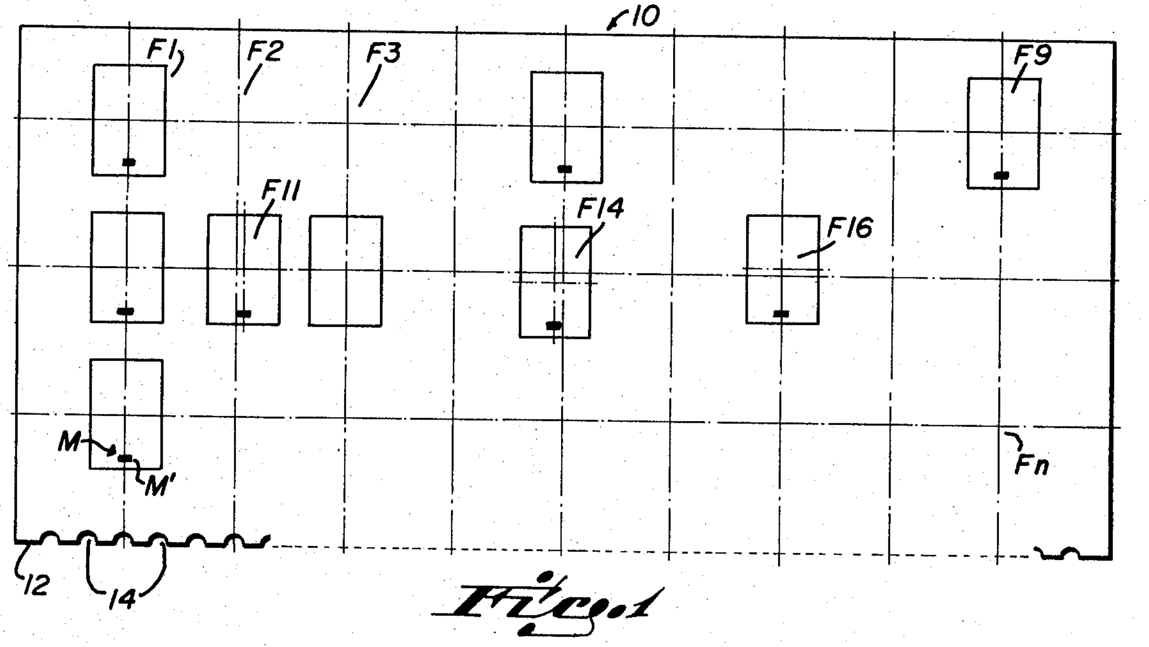
FIG. 1 is a front elevational view of a microfiche having multiple microfilm image frames of documents having reference marks centered adjacent the bottom edge thereof for facilitating fine positioning in accordance with the method and apparatus of the invention.

With reference to FIG. 1, an object bearing sensible material, preferably an information-bearing member in the form of a microfiche 10, is shown which is capable of being positioned in accordance with the apparatus and method of this invention. Typically, the microfiche 10 is rectangular in configuration, and approximately 8 inches long, 3 inches wide, and 10 mils thick, although the shape and dimensions can vary over a wide range. Located along the bottom edge 12 of the microfiche 10 is suitable microfiche identifying information, preferably in the form of coded notches 14 which facilitate mechanical selection by automatic means (not shown) of a particular microfiche from a group of different microfiche. One form of automated microfiche selecting apparatus is disclosed in U.S. Pat. No. 3,536,194 in the name of Warren Novak, issued Oct. 27, 1970.

The microfiche 10 incorporates a plurality of image frames F1, F2, . . . Fn which are generally arranged in a grid or matrix configuration (shown in phantom), with individual frames being located at the cross points of the grid or matrix. Each frame is susceptive of containing a microfilm image of a document bearing information in pictorial, printed form, etc. Centered along the bottom edge of each document image frame Fl, F2, . . . F*n* is a reference mark M described in detail hereafter. The reference mark M is photographically incorporated into the image frame at the time the image of the document is photographically incorporated into the microfiche 10. For example, if in the process of farming a document image F1, the document is placed in a suitable holder to facilitate photographic reproduction as a document image on the microfiche, a suitably dimensioned opaque rectangular element may be placed on top of the document adjacent the center of the lower edge thereof. In this way, the photographic operation which results in production of the document image F1 on microfiche 10 simultaneously results in production of the reference location mark M.

Ideally the document images F1, F2, . . . Fn are exactly spacially coincident with the cross points of the grid or matrix in which they are arranged. Were this so, location of a desired frame F1, F2, . . . Fn in the field of view of a suitable image reproduction unit such as the field of a TV camera could be accomplished, assuming the rectilinear coordinate position of the frame at which the desired document image is located is known, by positioning the microfiche with rectilinear positioning apparatus to locate the known coordinate position of the frame containing the desired document image in the field of view of the camera. In practice, however, the document images F1, F2, . . . Fn are not always centered with respect to the cross points of the grid or matrix arrangement. For example, document image F11 is displaced horizontally to the right with respect to its grid cross point, while document image F16 is displaced vertically upwardly with respect to its grid cross point. Document image F14 is displaced both horizontally leftwardly and vertically downwardly from the associated grid cross point.

In accordance with this invention, the microfiche 10, after mechanical retrieval from a group of different microfiche and placement in a selectively horizontally and vertically movable support or platen, is first coarsely positioned such that the grid cross point associated with the frame having the desired document image is centered with respect to the field of view of the camera. Selection of the desired card from a group of different cards is accomplished in response to entry into the system of the necessary address or identifying information for the desired microfiche, while location of the grid cross point associated with the frame containing the desired document is obtained in response to entry into the system appropriate information identifying the location or address of the desired frame with respect to the microfiche. Having selected the desired microfiche and positioned the grid cross point associated with the desired frame with respect to the field of view of the TV camera, the fine positioning apparatus and method of this invention is then employed, using locating mark M, to precisely and accurately position the image with respect to the TV camera scanning field. For example, if the horizontally rightwardly displaced frame F11 were coarsely positioned with respect to the TV camera scanning field, the fine positioning apparatus and method of this invention would move the microfiche leftwardly with respect to the TV camera to precisely horizontally center the image frame F11 relative to the camera field. Similarly, if frame F16, which is upwardly vertically misaligned with respect to associated grid intersection points, were coarsely positioned with respect to the TV scanning field, the fine positioning apparatus of this invention would move the microfiche downwardly to center document image F16 vertically with respect to the camera scanning field. The fine positioning apparatus and method of this invention would shift the microfiche 10 both horizontally rightwardly and vertically upwardly were the document image F14 to have been initially selected and coarsely positioned relative to the scanning field of the TV camera.

Figure 2:
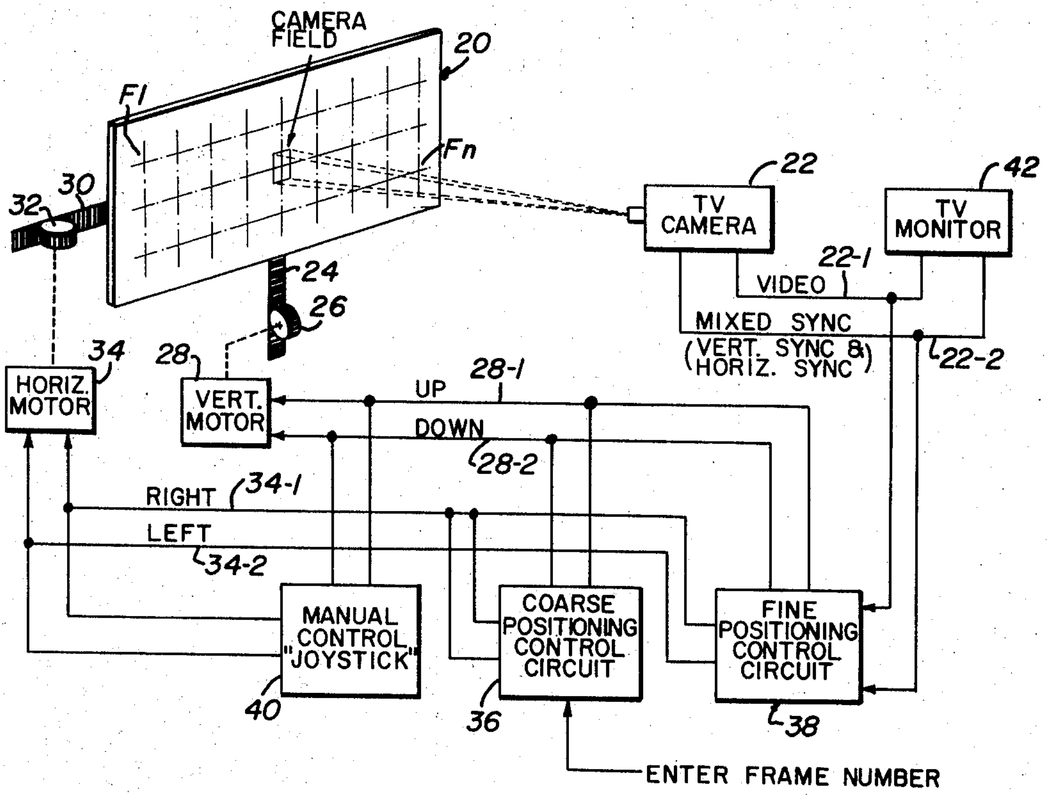
FIG. 2 is a schematic diagram of a document locating and viewing system incorporating the fine positioning apparatus and method of this invention.

With reference to FIG. 2, a microfiche positioning and viewing system, incorporating the fine positioning apparatus and method of this invention, is illustrated. A platen 20 capable of supporting a microfiche 10 for viewing an image frame thereof with a TV camera 22 is provided. The TV camera 22, with respect to microfiche 10 supported on platen 20, is such that the field of view of the TV camera is substantially coextensive with a single frame of the microfiche. The camera 22 provides a video signal output on line 22-1 correlated to sensible material transduced by the camera and sync signals synchronized with the line and field scanning operation of the camera, to be described in greater detail hereafter. The platen 20 is mounted for both vertical and horizontal motion. A vertical rack 24 extending downwardly from the platen 20 cooperates with a pinion 26 driven by a bidirectional positioning motor 28 to selectively position the platen and hence the microfiche 10 supported thereon in the vertical direction. Similarly, a horizontal rack 30 extending leftwardly from platen 20 cooperates with a pinion 32 driven by a bidirectional motor 34 to facilitate selective positioning of the platen and hence the microfiche located thereon in selective horizontal positions.

The vertical positioning motor 28 and horizontal positioning motor 34 each have two input lines, a signal present on one input line driving the motor in one direction while a signal on the other input line driving the mtor in the other direction. For example, vertical positioning motor 28 has input lines 28-1 and 28-2 which, when signals are present thereon, drive the motor 28 such that the platen 20 is moved vertically upwardly and vertically downwardly, respectively. The horizontal positioning motor 34 has inputs 34-1 and 34-2 which, when signals are present on these lines, drive the platen 20 horizontally rightwardly and horizontally leftwardly, respectively. Obviously, the positioning motors 28 and 34 could have single input control lines which, in response to different polarity signals, drive the motors in opposite directions. Other arrangements are possible. The specific platen positioning arrangement shown is merely for the purpose of illustration and forms no part of the invention. Positioning arrangements generally of the type shown in Warren D. Novak U.S. Pat. No. 3,405,996, issued Oct. 15, 1968, can be employed.

In the microfiche positioning and viewing system depicted in FIG. 2, the platen positioning motors 28 and 34 preferably are responsive to input control signals from three separate sources, namely, a coarse positioning control circuit 36, a fine positioning control circuit 38, and a manual control circuit 40. The coarse positioning control circuit 36, which forms no part of this invention, and accordingly is not detailed herein, typically may include circuitry which, in response to entry of a frame number therein, will develop appropriate positioning signals for the vertical and horizontal positioning motors 28 and 34 on lines 28-1, 28-2 and 34-1, 34-2 to position the platen 20 such that the grid cross point associated with the desired frame will be centered with respect to the scanning field of the TV camera 22. As described previously, depending upon whether the image frame is itself centered with respect to its associated grid cross point, the desired document image may or may not be precisely centered with respect to the scanning field of the TV camera 22.

The fine positioning control circuit of this invention is responsive to the camera video and sync signal outputs on lines 22-1 and 22-2 and functions, in a manner described hereafter, to develop control signals for the vertical and horizontal positioning motors 28 and 34 on lines 28-1, 28-2 and 34-1, 34-2 to locate the desired document image frame precisely and accurately with respect to the scanning field of the TV camera should the coarse positioning produced by control circuit 36 fail to achieve this result. Such is accomplished by determining the location of the reference location mark M and driving the vertical and horizontal positioning motors 28 and 34 in the necessary directions and to the extent required to position the reference location mark M of the desired image frame in the camera scanning field at a specified home position which, once the reference mark is coincident therewith, assures proper registration of the document image with respect to the scanning field of the TV camera 22.

The manual control circuit 40, typically under the control of a "joystick" or the like, enables the user of the system to vertically and horizontally shift the frame with respect to the scanning field of the TV camera once it has been located accurately and precisely by the fine positioning control circuit 38 of this invention. The manual control circuit 40 forms no part of this invention and accordingly is not further described herein.

Associated with the TV camera 22 and also responsive to the sync and video signals output therefrom on lines 22-1 and 22-2 is a TV monitor 42. The TV monitor 42 provides a visual display of the image scanned by the TV camera 22. Thus, the TV monitor 42 provides a visual read-out to the user of the desired document image frame of the selected microfiche.

Figure 3:
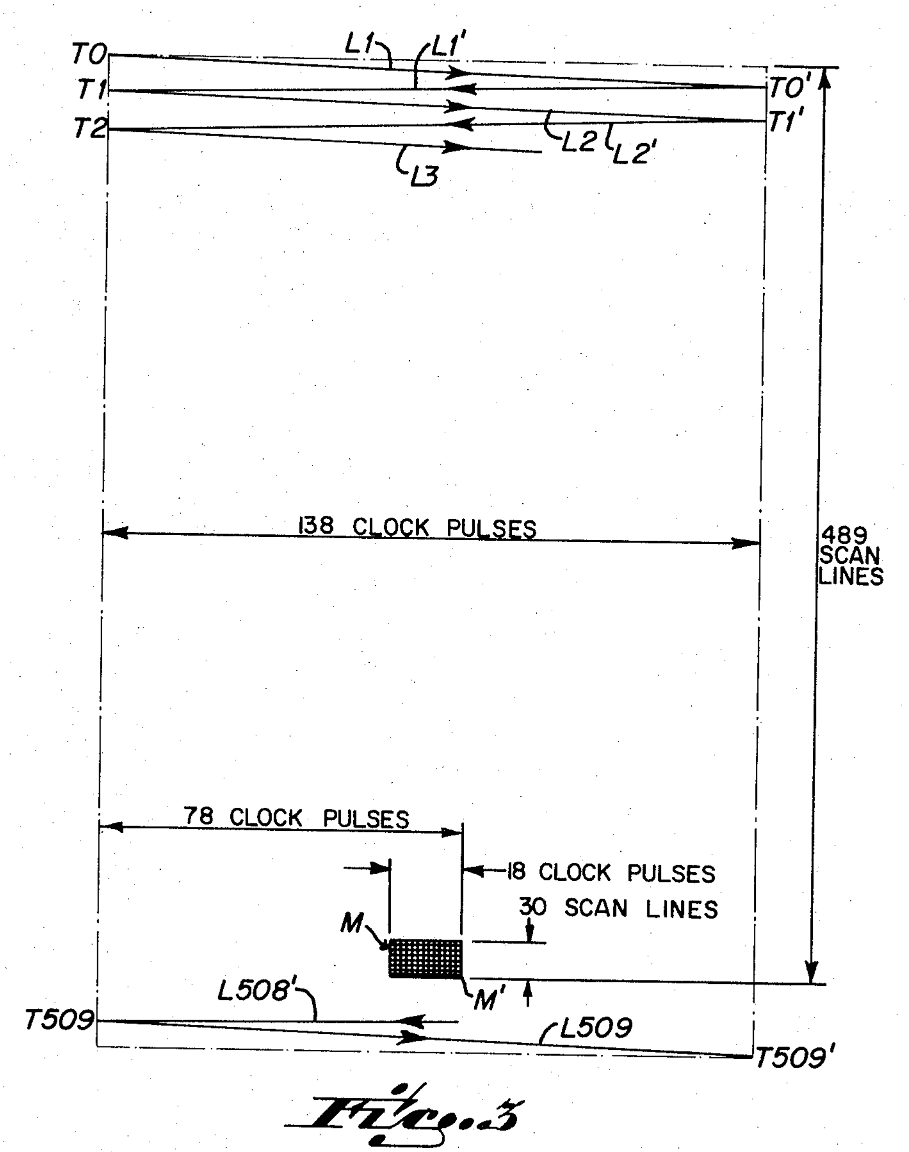
FIG. 3 depicts the scan field of a TV camera showing a single document image frame properly located with respect to the camera viewing field.

The TV scanning field is depicted in FIG. 3. With reference to this figure, the scanning field or pattern is seen to include a plurality of vertically spaced, horizontally disposed scan lines L1, L1', L2, L2', L3, L3', . . . Scan lines L1, L1', L2, L2', L3, L3', . . . are generated as the raster of the TV camera sweeps back and forth in a horizontal direction over the scanning field starting at the upper left corner and terminating at the lower right corner. The video information sensed or transduced by the TV camera during successive scans is output from the TV camera on video line 22-1 and takes the form of an analog electrical signal. During the time the TV camera raster is moving from right to left as viewed in FIG. 3, that is, during successive lines L1', L2', L3', . . . horizontal sync pulses are output from the video line 22-1 of the camera. These sync pulses can be used to blank the video information scanned by the raster as it moves from the right to the left back across the scanning field. The leading edge of the horizontal sync pulse is coincident with the raster reaching the right end of a scan as it moves from left to right, that is, is coincident with the terminating point of a scan line L1, L2, L3, . . . . The trailing edge of the horizontal sync pulse is coincident with the beginning of its associated left-to-right scan, that is, is coincident with the beginning point of a scan L1, L2, L3,. . .

There are as many horizontal sync pulses generated during the scanning of a field as there are unblanked horizontal scan lines L1, L2, L3, . . . in the left-to-right direction as viewed in FIG. 3.

A vertical sync pulse is provided at the output of the TV camera 22 on sync line 22-2 during the time the raster is moving from the point coincident with the end of the lowermost left-to-right horizontal scan line in the lower right corner of the field to the beginning of left-to-right horizontal scan line L1 in the upper left corner of the field. This vertical sync pulse can be used to effectively blank out the video information between the end of the last left-to-right scan line of a field scanning sequence and the beginning of the first left-to-right scan line of the field scanning sequence. In the course of positioning the TV camera raster from the lower right-hand corner of the field to the upper left hand corner of the field to initiate a new field scanning sequence, the raster traverses the field horizontally a plurality of times, for example, three times. As a consequence, the vertical sync pulse effectively overrides or obscures three horizontal sync pulses generated as the raster scans horizontally during the course of repositioning from the lower right corner of the field to the upper left corner of the field.

Superimposed on the TV camera scanning field depicted in FIG. 3 is a typical document image frame of the microfiche 10 as it appears following precise and accurate positioning by the fine positioning control circuit 38 of this invention. The reference location mark M, which takes the form of a black or opaque rectangle, is horizontally centered with respect to the camera scanning field and spaced slightly vertically upwardly from the bottom edge of the scanning field. In accordance with one form of the invention, a high resolution TV camera manufactured by General Precision Laboratories Division, Singer Inc., designated Model No. 1,000-B, was utilized and its unblanked video output sampled with 6 MHz clock signals. Such an arrangement provided approximately 512 horizontal left-to-right scan lines per field. Of the horizontal left-to-right scan lines unblanked by horizontal sync pulses, approximately three such scan lines are blanked by the vertical sync pulse. The reference mark M is dimensioned such that it has a vertical dimension equivalent to approximately thirty left-to-right horizontal scan lines and a horizontal dimension equivalent to approximately eighteen clock pulses. The instantaneous transucing area of the TV camera is appreciably less than the area of the reference mark. Additionally, the length of the mark M is less than the length of a scan line and its width greater than at least the spacing between two scan lines. The reference mark M is located on the document image frame of the microfiche such that when the document image is precisely centered in the camera field the bottom horizontal edge of mark M is coincident with the 489th left-to-right horizontal scan line and the right hand vertical edge of the mark M is spaced from the left hand vertical margin of the scanning field a distance equivalent to 78 clock pulses. With this arrangement, with the document image centered in the camera field, the coordinate point of the lower righthand corner M' of the mark M is 489 scan lines from the upper horizontal margin of the camera field and 78 clock pulses from the left vertical margin of the camera field.

Figure 4:
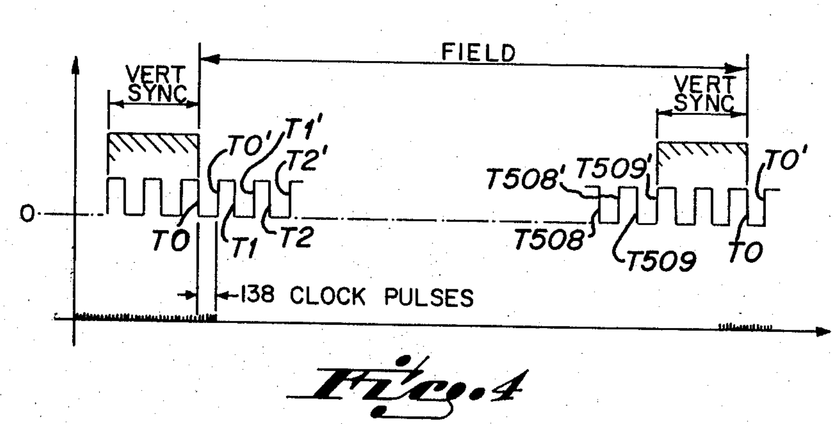
FIG. 4 is a plot with respect to time of the vertical sync and horizontal sync pulses produced by the TV camera as it scans the field depicted in FIG. 3.

FIG. 4 depicts the timing of the vertical and horizontal sync pulses with respect to each other and to the scanning lines of the camera scan pattern depicted in FIG. 3. With reference to this figure, and using as an example the camera described previously, there are approximately 512 horizontal sync pulses and one vertical sync pulse per camera field scanning sequence. The horizontal sync pulses occur during the right-to-left scans L1', L2', L3', . . . As a consequence, the leading edge of horizontal sync pulses occurring at times T0', T1', T2', . . . are coincident with the termination of left-to-right scan lines L1, L2, L3, . . . while the trailing edges T1, T2, T3, . . . of the horizontal sync pulses are coincident with the beginning of left-to-right scan lines L1, L2, L3, . . . The leading edge of the vertical sync pulses occurring at time T509' is coincident in time with the termination of left-to-right horizontal scan line L509, while the trailing edge of the vertical sync pulse is coincident in time with the start of the first left-to-right horizontal scan line L1. Thus, start of a scanning field is coincident with the trailing edge of a vertical sync pulse while the end of a scanning field is coincident with the leading edge of the vertical sync pulse occurring at the end of left-to-right scan line L509. Similarly, the beginning of successive horizontal scan lines is coincident with the trailing edge of successive horizontal sync pulses, while the termination of successive horizontal scan lines is coincident with the leading edge of successive horizontal sync pulses.

Figure 5:
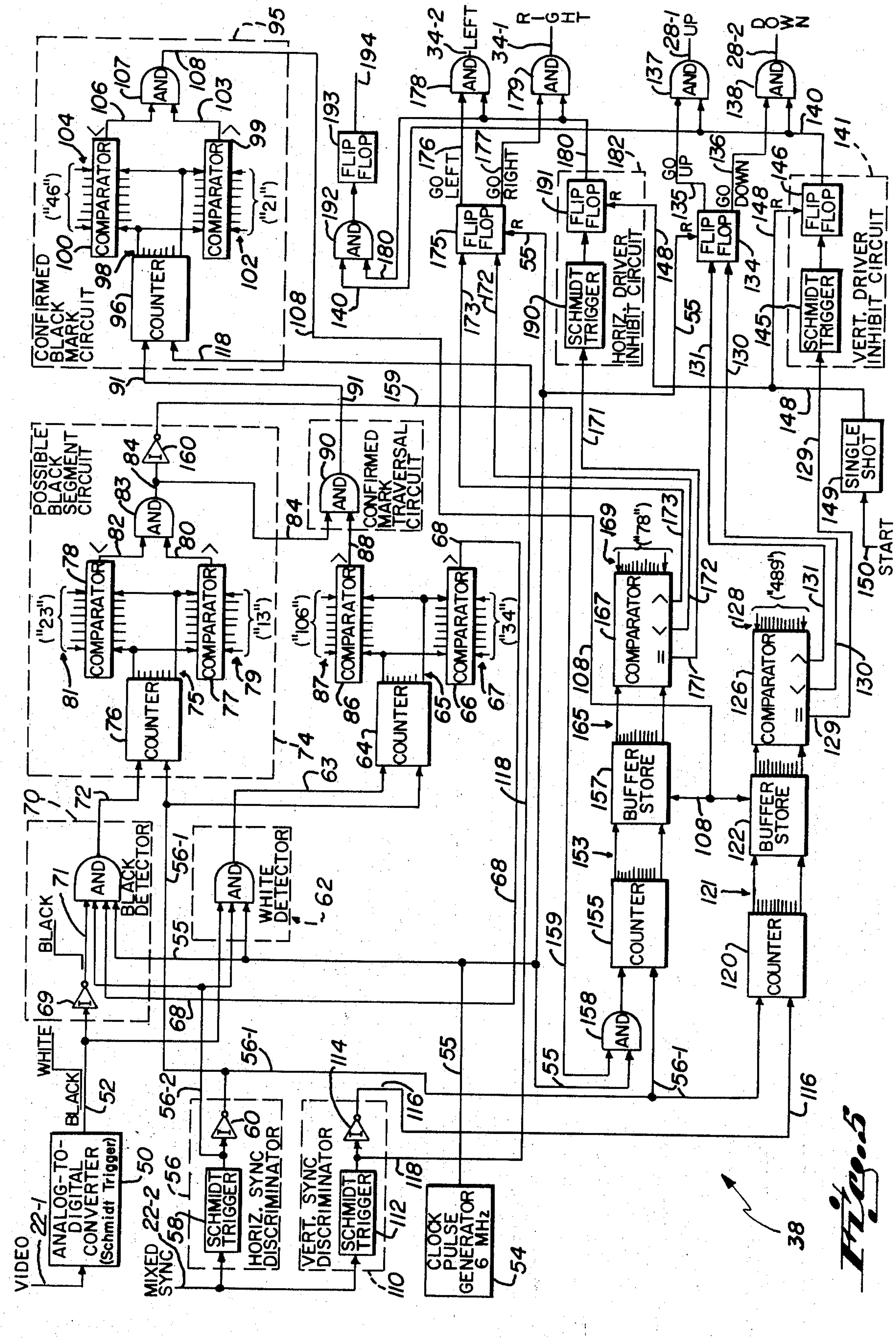
FIG. 5 is a detailed schematic circuit diagram of a preferred embodiment of the fine positioning apparatus of this invention.

FIG. 5 depicts a preferred form of fine positioning control circuit 38 useful in the system shown in FIG. 2 for accurately and precisely centering the desired document image frame with respect to the viewing field of the TV camera 22 once it has been coarsely positioned with the coarse positioning control circuit 36. The fine positioning control circuit shown in FIG. 5 functions to ascertain that the locating mark M has been found in the course of a camera field scanning operation by TV camera 22; further ascertains the coordinate position location of the lower right hand corner M' of reference mark M with respect to the scanning field in terms of the number of scan lines from the top horizontal margin of the camera field and the number of clock pulses from the left vertical margin of the camera field; and repositions the microfiche via motors 28 and 34 until the location of point M' of reference mark M coincides, in terms of scan lines from the top margin of the field and clock pulses from the left margin of the field, with the desired location of the point M' occupied when its associated document image is centered both horizontally and vertically with respect to the scanning field of the TV camera 22.

The fine positioning control circuit 38 depicted in FIG. 5 includes analog-to-digital converter 50 having an output line 52, and an input line 22-1 which constitutes the video output line of the TV camera 22. Present on analog-to-digital converter line 22-1 are video signals, in analog form, representing the graphic information transduced, sensed, or picked-up by the TV camera 22 in the course of making its successive scans L1, L1', L2, L2', L3, L3', . . . The analog/digital converter 50, which may take the form of a Schmidt trigger, provides on its output line 52 a logical '1' signal when the analog input signal thereto on line 22-1 is above an arbitrary threshold level and a logical '0' signal when the input thereto is below the arbitrarily selected threshold. If the analog video signal input to the analog/digital converter 50 produces a logical '1' signal on output line 52, the video information input thereto is deemed to be "white," while if the input on line 52 is logical '0', the video signal input to the analog/digital converter is deemed to be "black." Thus, the analog/-digital converter 50 converts the analog input signals thereto which range from 100 percent black to 100 percent white (with gradations therebetween representing various shades of gray) to output signals which are either "white" or "black," that is, either logical '1' signals or logical '0' signals. Of course, the analog video signal present on TV camera output line 22-1 is not digitized in the course of being input to the TV monitor 42 (shown in FIG. 2) and as a consequence the user of the system viewing the TV monitor 42 does see a picture which includes 100 percent black, 100 percent white, and variations of gray between the extremes of black and white.

To facilitate sampling of the digitized video signal on line 52 during horizontal scan lines moving from left to right, i.e., horizontal scan lines L1, L2, L3, . . . , a clock pulse generator 54 and a horizontal sync pulse discriminator 56 are provided. The clock pulse generator 54 is preferably an astable multivibrator having a frequency of 6 MHz, providing on its output line 55 a continuous stream or sequence of clock pulses at a frequency of 6 MHz. The horizontal sync pulse discriminator 56, which preferably includes a Schmidt trigger 58, followed by an inverter 60, provides on its output line 56-1 a pulse of specified amplitude coincident with the receipt of a horizontal sync signal on the camera sync output line 22-2. A complimentary output line 56-2 from the horizontal sync pulse discriminator 56 taken at the output of the Schmidt trigger 58 provides a logical '1' pulse during the intervals between receipt of horizontal sync pulses, that is, during the interval between the trailing edge of one received horizontal sync pulse and the leading edge of the successive horizontal sync pulse. Thus, on horizontal sync pulse discriminator output lines 56-1 and 56-2, logical '1' pulses are provided coincident with the duration and spacing, respectively, of the received horizontal sync pulses input to circuit 56.

A "white" detector circuit 62 in the form of an And-gate is provided to sample the digitized "white" video signal on line 52 at the 6 MHz clock rate during the interval between received horizontal sync pulses, that is, during left-to-right horizontal scan lines L1, L2, L3, . . . and provide on its output line 63 logical '1' signals corresponding to "white" signal samples occurring during left-to-right scans L1, L2, L3, . . . The "white" detector 62 is responsive to the clock signals on line 55, the horizontal sync signals on line 56-2, and the digitized white video signals on line 52. The digitized white video signals occurring during left-to-right video scans L1, L2, L3, . . . present on line 63 are input to a white counter 64. The counter 64 which may take the form of a conventional binary pulse counter, is reset at the start of each left-to-right horizontal scan L1, L2, L3, . . . by a horizontal sync pulse input thereto on line 56-1. White counter 64 begins to count white signal samples at the beginning of each left-to-right scan line L1, L2, L3, . . . and is reset to a zero count at the end of each left-to-right horizontal scan L1, L2, L3, . . . The accumulated count in white counter 64 at any given time during a horizontal scan line represents the number of white signal samples output from the white detector 62 during that particular horizontal scan line. For reasons to become apparent hereafter, it is desirable that the white counter 64 have a capability of accumulating a count in an excess of 106, a count of 106 white samples in a given horizontal scan line being arbitrarily selected as the minimum acceptable number of white samples in a scan line if that scan line horizontally intersects the reference mark M.

Associated with the white counter 64 and having its input lines connected to the output of the white counter is a comparator 66. The comparator 66 is provided with a second set of input lines 67 on which are present binary signals representing the arbitrary decimal number "34" for reasons to become apparent. The comparator 66 provides on its output line 68 a logical '1' signal to a black detector 70, to be described, when 35 white video signal samples have been accumulated in counter 64 during any particular left-to-right horizontal scan line L1, L2, L3, . . . For reasons to become apparent, before "black" video signals are considered legitimate for sampling purposes prior to counting to determine the existence of a reference mark M, it has been deemed preferable to first require as a condition precedent that there have been at least 34 white video signal samples in the particular horizontal left-to-right scan line L1, L2, L3, . . . in question. In this way, if the document image is positioned to the right with respect to the television scanning field such that the inter-image space between a) the right vertical edge of the document image which is to the left of the document image in question and b) the right vertical edge of the document image under consideration, which typically is black, is in the viewing field, the resulting "black" video signal samples between adjacent frames will be ignored.

The logical '1' signal output on line 68 from the comparator 66, which indicates that at least 34 white video signal samples have occurred during the particular left-to-right horizontal scan in question L1, L2, L3, . . . , is input to the black detector 70 which takes the form of an And-gate. The black detector 70 is also responsive to the clock pulses on line 55, the horizontal sync signal on line 56-2, and the logical '1' digitized white video signal on line 52 following inversion in an inverter 69 which provide on line 71 a logical '1' signal when the digitized video signal is black. With this assemblage of inputs to And-gate 70, logical '2' black signal samples are provided on output line 72 at the clock rate during left-to-right scan lines L1, L2, L3, . . . when the digitized video signal on line 52 is black and there have been at least 34 white video signal samples since the beginning of the left-to-right horizontal scan line in question.

To determine if in the course of a horizontal scan line L1, L2, L3, . . . a reference mark M was traversed horizontally, "possible black segment" circuit 74 is provided. The circuit 74 includes a black counter 76 which is responsive to the black detector 70 on line 72. The black counter 76 is reset at the beginning of each left-to-right horizontal scan line L1, L2, L3, . . . by the horizontal sync signals input thereto on line 56-1. The black counter 76 accumulates a count during each horizontal scan line of the black video signal samples which have occurred following a minimum of 34 white video samples. Ideally the horizontal dimension or length of the reference mark M in the direction of a horizontal scan line is equivalent to 18 clock pulses. However, to provide some tolerance in length of the reference mark M, a count of at least 14 and not more than 22 black video signal samples (occurring after receipt of at least 34 white video signal samples) in a single left-to-right horizontal scan line L1, L2, L3, . . . is deemed to represent the traversal in a horizontal scan line of the reference mark M.

Associated with the black counter 76 are a comparator 77 and a comparator 78 both of which have one set of their inputs responsive to the output lines 75 of the black counter 76. The comparator 77 has its other set of input lines 79 provided with appropriate binary signals representing the decimal number "13," providing on comparator output line 80 a logical '1' signal if the black count in counter 76 exceeds a count of 13. Comparator 78 has its other set of input lines 81 provided with binary signal levels representing the decimal number "23," with the result that an output is provided on comparator output line 82 if the black count in counter 76 is 22 or less. The comparator outputs on lines 80 and 82 are input to an And-gate 83 which provides on its output line 84 a logical '1' signal if between 14 and 22 black video signal samples occurring in a given horizontal scan line L1, L2, L3, . . . following receipt of at least 34 white video signal samples. A logical '1' output on line 84 representing the conditions indicated is termed herein a "possible black segment" signal.

To further confirm that the possible black segment signal output on line 84 from the "maybe" circuit 74 is indeed representative of the traversal in a single horizontal scan line L1, L2, L3, . . . of a true black reference mark M, a comparator 86 is provided. The comparator 86 is responsive to the white counter output line 65 and a set of input lines 87 provided with binary signals representing the decimal number "106." It will be recalled that the white counter 64 accumulates a count equal to the numeber of white video signal samples occurring during a given horizontal scan line L1, L2, L3, . . . It will also be recalled that detection of between 14 and 22 black video signal samples occurring after at least thirty-four white signal samples in a given horizontal scan line L1, L2, L3, . . . will not be considered conclusive of the traversal in a given horizontal scan line of the black reference mark M unless also occurring in that horizontal scan line are at least one hundred six sampled white signals.

Accordingly, one set of inputs on line 65 to the comparator 86 represent the white video signal samples while the other set of inputs on line 87 represents the necessary minimum number of white video signal samples in a given horizontal scan line L1, L2, L3, . . . required to confirm that a "possible black segment" signal on line 84 output from the circuit 74 does indeed represent the traversal in a given horizontal scan line of a reference mark M. The comparator 86 provides on its output line 88 a logical '1' output when in a given horizontal scan line there have been at least one hundred seven white video signal samples. This logical '1' output on line 88 is input to an And-gate 90 which is also responsive to the "possible black segment" signal on line 84 from circuit 74. And-gate 90 provides on its output line 91 a logical '1' signal indicating that between fourteen and 22 black video signal samples occurred preceded by 35 or more white video signals, and a total of at least 107 white video signal samples, all such conditions occurring in a single horizontal scan line L1, L2, L3, . . . The output from And-gate 90 on line 91 is herein termed the "confirmed black segment" signal.

As described, a logical '1' output on line 91 from And-gate 90 is deemed conclusive of the fact that the mark M has been traversed horizontally in the course of a horizontal scan line L1, L2, L3, . . . To ascertain that the entire black mark M has been sensed in the course of a field scanning operation by the TV camera 22, the number of "confirmed black segment" signals produced during a single field scanning operation is counted. Ideally, since the vertical dimension or width of the black mark M is equivalent to 30 horizontal scan lines L1, L2, L3, . . . , the production of 30 "confirmed black segment" signals in a given field scanning operation would be indicative of the fact that a mark M is in the field of the TV camera 22. However, to provide some tolerance in the mark sensing operation and to accommodate dimensional variations in the width of the mark M, a mark M is deemed to have been found if in a single field scanning operation between 22 and 45 confirmed black segment signals are produced. To accomplish the foregoing, a "confirmed black mark" circuit 95 is provided which includes a counter 96 responsive to the confirmed black segment signals on line 91. The counter 96 is reset to a count of zero prior to each field scanning opeation, that is, prior to horizontal scan line L1. The count accumulated in counter 96 in any given point in a field scanning operation represents the total number of "confirmed black segment" signals produced up to that point in the field scanning operation. Accordingly, the output on lines 98 from the counter 96 at any given point in a field scanning operation represents the number of "confirmed black segments," i.e., mark traversals, detected up to that point in the field scanning operation.

The output lines 98 of counter 96 are input to a comparator 99 and a comparator 100. The comparator 99 has another set of inputs 102 which has applied to it binary signals representing the decimal number "21." As a consequence, comparator 99 provides on its output line 103 a logical '1' signal when the "confirmed black segment" count in counter 96 during a given field scanning operation exceeds 21. Counter 100 has its other set of inputs 104 provided with binary signals representing the decimal number "46" to provide on its output line 106 a logical '1' signal when the number of "confirmed black segments" in a given field scanning operation, as accumulated in the counter 96, is less than 46. An And-gate ωresponsive to the outputs of comparators 99 and 100 on lines 103 and 106 provide a logical '1' output on line 108 when the number of "confirmed black segments" in a given field scanning operation is between 22 and 45, which is the criteria selected for determining whether a black mark has been sensed. Accordingly, a signal is produced on line 108 when an entire black mark M has been sensed.

To accomplish resetting of the "confirmed black segment" counter 96, a vertical sync pulse discriminator 110 is provided which preferably takes the form of a Schmidt trigger 112 and an inverter 114. The vertical sync pulse discriminator 110 is responsive to the sync signal from the TV camera 22 present on line 22-2 and provides on output line 116 a logical '1' pulse upon receipt of a vertical sync signal from the TV camera. A complimentary output is provided by the $\overline{\text{vertical sync}}$ discriminator 110 in the form of a $\overline{\text{vertical sync}}$ signal on line 118. The vertical sync signal on line 118 is input to the confirmed black segment counter 96, effectively resetting this counter prior to the initiation of each field scanning operation, that is, prior to the initiation of horizontal scan line L1.

Since the television camera raster is scanning in a first direction, i.e., from left to right, and in a second direction, i.e., from top to bottom, as viewed in FIG. 3, at the instant a "confirmed black mark" signal is produced on line 108 from the confirmed black mark circuit 95, the TV camera raster is located at point M' of the mark M, that is, at the lower righthand corner of the mark. The coordinate position of the camera scanning raster when it is at point M' of the mark M, in terms of the number of scan lines from the top margin of the camera scanning field and the number of clock pulses from the left margin of the camera scanning field, is monitored by circuitry to be described. When point M' has a coordinate position with respect to the scanning field of 489 scan lines from the top of the camera scanning field and 78 clock pulses from the left margin of the camera scanning field, the mark M is deemed to be properly located with respect to the camera scanning field such as to place the entire document in the view of the camera scanning field. If the horizontal coordinate position of point M' is less than 78 clock pulses from the left margin of the camera field, the horizontal platen positioning motor 34 indexes the platen 20 to the right, whereas if the horizontal coordinate position of mark M' is greater than 78 clock pulses from the left margin, the horizontal positioning motor drives the platen 20 to the left. Similarly, if the vertical coordinate position of the point M' exceeds 489 scan lines from the top margin of the camera field, the vertical positioning motor 28 drives the platen 20 upwardly, whereas if point M' is less than 489 scan lines from the top margin, the vertical positioning motor drives the platen downwardly. Positioning movement of the platen 20 by the horizontal and vertical positioning motors 34 and 28 continues until the platen has been located to place point M' at the desired coordinate position of 78 clock pulses from the left vertical margin of the scanning field and 489 scan lines from the top horizontal margin of the scanning field. When the desired coordinate position has been reached, a signal is produced inhibiting further control of the vertical and horizontal positioning motors by the fine positioning control circuit 38.

To ascertain the vertical coordinate position of point M' with respect to the scanning field, a counter 120 and buffer store 122 are provided. The counter 120, which is reset at the beginning of each field scanning operation by the vertical sync pulse on line 116 input thereto, is responsive to the horizontal sync pulse on line 56-1, and operates to provide a count which at any given time in a frame scanning operation reflects the number of horizontal scan lines L1, L2, L3, . . . which have been scanned to that point in a field scanning operation. Thus, the output lines 121 of the counter 120 provide signals which at any given point in a frame scanning operation correspond to the number of left-to-right horizontal scan lines L1, L2, L3, . . . which have been scanned to that point in a field scanning operation.

The comparator 122, which is responsive to the output of the counter 120, is strobed by the "confirmed black mark" signal present on line 108, which as indicated is produced when the scanning raster of the TV camera 22 coincides with the lower right hand corner point M' of mark M. As a consequence of strobing the buffer store 122 coincident with the generation of the "confirmed black mark" signal on line 108, the buffer store which stores the content of the counter 120 at the time strobed, will store a count corresponding to the vertical coordinate position of point M' in terms of left-to-right horizontal scan lines.

To determine whether the vertical coordinate position, in terms of left-to-right horizontal scan lines L1, L2, L3, . . . , is greater, less than, or equal to the desired vertical coordinate position, which is 489 scan lines from the top margin of the camera scanning field, a comparator 126 is provided. The comparator 126 has one set of inputs connected to the output of the buffer store 122 and another set of inputs 128 provided with signals representing the decimal number "489" which is the desired vertical coordinate position (in terms of scan lines) of the point M'. The comparator 126 is provided with three output lines, namely, 129, 130, and 131. A logical '1' output signal is provided on comparator output line 129 when the vertical coordinate position of point M' is equal to that desired, namely, 489 left-to-right horizontal scan lines from the top horizontal margin of the camera scanning field, in which case further vertical positioning of the platen 20 by the vertical motor 28 is unnecessary.

A logical '1° output from the comparator 126 is provided on line 130 when the point M' is closer to the upper margin of the camera scanning field than desired, in which case the platen 20 is driven downwardly by the vertical positioning motor 28. A logical '1' output is provided on comparator output line 131 when the mark M' is closer to the lower margin of the camera scanning field than desired, in which case the platen 20 is moved vertically upwardly by the vertical positioning motor 28.

Specifically, comparator output lines 130 and 131 are input to an "up/down" flip-flop 134 which provides on its output lines 135 and 136 logical '1' signal levels when upward and downward motion is desired, respectively. "Up" signal line 135 and "down" signal line 136 are input to And-gates 137 and 138, respectively. And-gates 137 and 138 are also responsive to the output on line 140 of a vertical motion inhibit circuit 141, to be described, which is at a logical '1' level so long as a logical '1' signal is not present on comparator output line 129 indicating that point M' is at the desired vertical coordinate position. Assuming that point M' is not at the desired vertical coordinate position of 489 scan lines from the top margin of the camera field and that a logical '1' signal is output from the vertical inhibit circuit 141 on line 140, And-gates 137 and 138 will be enabled. With And-gates 137 and 138 enabled, a logical '1' output will be provided by And-gate 137 on line 28-1 if the comparator 126 provides a logical '1' on its output line 131 indicating that the point M' is below the desired vertical position, while a logical '1' signal will be output from And-gate 138 if a logical '1' signal is present on line 130 indicating that the point M' is above the desired vertical position. With logical '1' signals output, on an alternative basis, from And-gates 137 and 138 on lines 28-1 and 28-2, the vertical positioning motor 28 will drive platen 20, on an alternative basis, vertically upwardly or vertically downwardly.

The vertical inhibit circuit 141 preferably includes a Schmidt trigger 145 and a flip-flop 146. The presence of a logical '1' on comparator output line 129, indicating that the vertical location of point M' is at the desired location, is input to the Schmidt trigger 145, producing an input to the flip-flop 146, switching this flip-flop to provide a logical '0' signal on its output line 140 which in turn inhibits the "up" And-gate 137 and the "down" And-gate 138 preventing up and down signals from being provided on lines 28-1 and 28-2 to the vertical platen positioning motor 28. The vertical inhibit circuit 141 is reset prior to each fine positioning control operation by a reset signal provided on line 148 from a single shot circuit 149 in response to a start signal on line 150 produced by appropriate means (not shown). For example, the start signal on line 150 could be produced as an incident to entering the number of a desired frame into the course positioning circuit 36 (FIG. 2).

Horizontal location of the point M' in a given field scanning operation, in terms of the number of clock pulses from the left margin of the scanning field, is provided by a counter 155 and a buffer store 157. The counter 155 is reset at the beginning of each left-to-right horizontal scan L1, L2, L3, . . . by the horizontal sync pulse present on line 56-1. Clock pulses from the clock pulse generator 54 on line 55 are input to the counter 155 via an And-gate 158 which is enabled by a $\overline{\text{possible black segment}}$ signal on line 159. The $\overline{\text{possible black segment}}$ signal is generated by inverting in an inverter 160 the "possible black segment" signal provided by And-gate 83 on line 84. As a consequence of the input on line 159 to the And-gate 158, clock pulses output from generator 54 on line 55 are gated to the counter 155 only during that period between the beginning of a horizontal scan line L1, L2, L3, . . . and the point in time when the right hand vertical edge of a black mark M is sensed, which is coincident with the generation of the "possible black segment" signal on line 84.

The counter 155, in view of the manner in which it is reset and clock pulses gated to it, accumulates a count which at any given point in a horizontal scan line L1, L2, L3, . . . reflects the number of clock pulses produced from the beginning of the horizontal scan line to the particular point in question during the horizontal scan line. The signals output from the counter 155 on counter output line 153, at any particular point in a horizontal scan line L1, L2, L3, . . . , reflect the accumulated count of counter 155.

The counter output lines 153 constitute the input to the buffer store 157. The buffer store 157 is strobed coincident with the generation of the "confirmed black mark" signal on line 108 coincident with the scanning of point M′ by the TV camera raster. When the buffer 157 is strobed on line 108, the contents of the counter 155 are stored in the buffer store, providing on buffer store output lines 165 binary signals reflecting the horizontal position of mark M′ in terms of the distance, in clock pulses, between the left margin of the camera scan field and point M′.

A comparator 167 having one set of inputs responsive to the buffer output lines 165 is provided to compare the horizontal location of point M′ in a particular field scanning cycle against the desired horizontal location of point M′ which is 78 pulses from the left margin of the scanning field. Another set of inputs 169 to the comparator 167 is provided with binary signals representing the decimal number "78" which corresponds to the desired location, in clock pulses, of the mark M′ from the left margin of the camera scanning field. If the horizontal location of point M′ is 78 clock pulses from the left margin of the scanning field, a logical '1' signal will be output on line 171 of the comparator 167. A logical '1' signal is produced on comparator output line 172 if point M′ is located to the left of the desired horizontal position, while a logical '1' signal is produced on comparator output line 173 if point M′ is located to the right of the desired horizontal position.

Comparator output lines 172 and 173 are input to a flip-flop 175 having output lines 176 and 177 on which logical '1' signals are present when point M′ is located rightwardly and leftwardly, respectively, of the desired horizontal location of 78 clock pulses from the left margin of the scanning frame. And-gates 178 and 179 are responsive to flip-flop output lines 176 and 177, respectively, as well as to output line 180 of a horizontal inhibit circuit 182. Assuming that point M′ is not located at the desired position and that, therefore, there is no logical '1' output signal on output line 171 which constitutes the input of the horizontal inhibit circuit 182, a logical '1' signal will be present on output line 180 of the horizontal inhibit circuit 182, enabling And-gates 178 and 179 to respond to the output of the flip-flop 175. Thus, if the point M′ is not yet properly located horizontally and a logical '1' signal is not present on line 171, left and right drive signals will be provided on lines 34-2 and 34-1 to the horizontal positioning motor 34 on an alternative basis to drive the platen 20 and hence the microfiche 10 horizontally to the left or horizontally to the right depending upon whether point M′ is to the right or to the left of the desired home position of 78 clock pulses from the left margin of the clock scanning field.

If the horizontal position of point M′ is at the desired location 78 clock pulses from the left margin of the scanning field, a logical '1' signal is provided on line 171 which produces a logical '0' on the horizontal drive inhibit circuit output line 180, in turn disabling And-gates 178 and 179 to prevent any horizontal positioning motion. Preferably, the horizontal inhibit circuit 182 includes a Schmidt trigger 190 and a flip-flop 191. Flip-flop 191 is responsive to the reset signal on line 148 from the single shot 149 produced as a consequence of the start signal on line 150 generated prior to a fine positioning operation.

If desired, an And-gate 192 responsive to the outputs on lines 180 and 140 from the horizontal inhibit circuit 182 and vertical inhibit circuit 141 may be provided along with a flip-flop 193 to produce a signal on output line 194 indicative of the fact that point M′ is properly located both horizontally and vertically. The output signal on line 194 may be utilized to transfer positioning control of the platen 20, and hence the microfiche 10, from the fine positioning control circuit 38 to the manual control circuit 40 (FIG. 2).

The fine positioning control circuit 38, in summary, processes the video and sync signals from successive field scanning cycles of the camera 22 and during each field scanning processing cycle determines that the entire mark M has been sensed, as well as the coordinate position of the specific point M′, compares the location of the point M′ with the desired coordinate location, and in response to any difference in the actual and desired coordinate position of point M′ develops motor drive signals for repositioning the platen 20 and hence the selected document image of the micorfiche 10. The field scanning processing cycle is repeated as an incident to each successive field scanning operation until the actual coordinate position of the point M′ coincides with the desired coordinate position. Once this condition of spatial coincidence has been achieved, further processing of the video and sync signals by the fine positioning control signal 38 is terminated.

Having described the invention, it is claimed:

1. Apparatus for viewing and positioning an object having sensible material thereon, including at least a rectangular reference mark of predetermined length and width, comprising:

a camera having a field of view repeatedly scanned along successive lines parallel to said mark length and spaced from each other in the direction of said mark width, said mark width being greater than twice the spacing between adjacent scan lines, said successive scanning of said lines being at a specified line scan rate, said camera including means providing a) a video output signal representing sensible material transduced by said camera during said scanning, b) successive line sync signals synchronized with scans of successive lines of said field, and c) successive field sync signals synchronized with successive scans of said field, means responsive to said video and sync signals for visually displaying said sensible material transduced by said camera during said scanning, clock means for generating clock signals at a rate substantially in excess of said specified line scan rate, means responsive to said video, clock, and line sync signals for detecting traversal of said mark during scanning of a line, said means including a first counter under control of said video and line sync signals which counts the clock signals occurring during scanning traversal of a mark in a single line and producing a mark traversal signal when said first counter achieves a specified clock count condition, a second counter for counting said mark traversal signals occurringduring scanning of said field to determine the number of occurring during in which said mark was traversed during scanning of said field, means responsive to said second counter for generating a mark sensed signal when said second counter achieves a specified count condition, third counting means reset by said line sync signals and responsive to said clock signals and said mark sensed signals for determining a first actual coordinate position of a specified point of said mark in the direction of said mark length, fourth counting means reset by said field sync signals and responsive to said line sync signals and said mark sensed signals for determining a second actual coordinate position of said specified point of said mark in the direction of said mark width, means responsive to said third and fourth counters for comparing said actual coordinate positions of said specified point of said mark against desired coordinate positions and in response thereto generating length-directed and width-directed repositioning signals correlated to the differences between said actual coordinate positions and said desired coordinate positions, and motor means responsive to said length-directed and width-directed repositioning signals for relatively repositioning said object and camera field in said length and width directions to locate said specified point of said mark at said desired coordinate positions.

2. Apparatus for viewing and positioning an object having sensible material thereon, including at least a rectangular reference mark of predetermined length and width, comprising:

a camera having a field of view repeatedly scanned along successive lines parallel to said mark length and spaced from each other in the direction of said mark width, said mark width being greater than twice the spacing between adjacent scan lines, said successive scanning of said lines being at a specified line scan rate, said camera including means providing a) a video output signal representing sensible material transduced by said camera during said scanning, b) successive line sync signals synchronized with scans of successive lines of said field, and c) successive field sync signals synchronized with successive scans of said field, clock means for generating clock signals at a rate substantially in excess of said specified line scan rate, means responsive to said video, clock and line sync signals for detecting traversal of said mark during scanning of a line and producing a mark traversal signal, means responsive to said field sync signals and said mark traversal signals occurring during scanning of a field for detecting the presence of a mark in said field and generating a mark sensed signal correlated to a specified point within said mark, means responsive to said line sync signals, said clock signals, and said mark sensed signal for generating a first actual coordinate position signal for said specified point of said mark in the direction of said mark length, means responsive to said line sync signals, said field sync signals, and said mark sensed signals for generating a second actual coordinate position signal for said specified point of said mark in the direction of said mark width, means responsive to said first and second actual coordinate position signals for generating length-directed and width-directed repositioning signals correlated to the difference between said actual coordinate positions and desired coordinate positions, and motor means responsive to said length-directed and width-directed repositioning signals for relatively repositioning said object and camera field in said length and width directions to locate said specified point of said mark at said desired coordinate positions.

3. The apparatus of claim 2 wherein said camera has an instantaneous transducing capability substantially less in area than the area of said mark, said scan lines are individually generated by transducing motion in a first direction parallel to said mark length, with each succeeding scan line being spaced from the preceding scan line in a second direction parallel to said mark width and perpendicular to said first direction, and said specified point of said mark is located at the corner of said mark located furthest in said first and second directions, whereby said mark sensed signal is generated coincident with transducing of said corner.

4. The apparatus of claim 2 wherein;

said camera has an instantaneous transducing capability substantially less in area than the area of said mark, said mark traversal signal generating means includes a counter which counts clock signals generated during scanning of a single line and generates said mark traversal signal when said clock signal counter reaches a specified count condition following receipt of at least a plurality of clock signals, said mark sensed signal generating means includes a counter which counts mark traversal signals generated during a single field scanning and generates said mark sensed signal when said mark traversal signal counter reaches a specified count condition following receipt of at least a plurality of mark traversal signals, said plurality of mark traversal signals and said plurality of clock signals being correlated in number to said mark width and length, respectively.

5. The apparatus of claim 1 wherein:

said object is an image frame of a microfiche, said frame being surrounded by a sensible material border and including within and spaced from said border said sensible reference mark, and said mark traversal signal generating means includes
a. an additional counter under control of said video and line sync signals for detecting the absence of sensible material in a line scan by counting clock signals occurring in the absence of sensible material during that portion of a line scan between said mark and at least a portion of said border, and
b. means responsive to said additional counter for controlling said first counter to inhibit generation of a mark traversal signal until said additional counter achieves a predetermined count condition.

6. Apparatus for viewing and positioning an object having sensible material thereon, including at least a rectangular reference mark of predetermined length and width, comprising:
a camera having a field of view repeatedly scanned along successive lines parallel to said mark length and spaced from each other in the direction of said mark width, said mark width being greater than twice the spacing adjacent scan lines, said successive scanning of said lines being at a specified line scan rate, said camera providing a video signal correlated to said sensible material and sync signals correlated to said scan lines and field,
means responsive to said camera for detecting traversal of said mark during scanning of a line and producing a mark traversal signal,
means responsive to said camera and a predetermined quantity of said mark traversed signals occurring during scanning of a field for detecting the presence of a mark in said field and generating a mark sensed signal correlated to a specific point within said mark,
means responsive to said mark sensed signal and said camera signals for generating actual coordinate position signals in the directions of said length and width for a specific point within said mark,
means for generating signals correlated to the desired coordinate position of said specific point,
means responsive to said actual and desired coordinate position signals for generating length-directed and width-directed repositioning signals correlated to the difference between said actual and desired coordinate positions, and
motor means responsive to said length-directed and width-directed repositioning signals for relatively repositioning said object and camera field in said length and width directions to locate said specific point of said mark at said desired coordinate positions.

7. A method of positionally registering an object relative to a camera scanning field comprising the steps of:
placing a sensible rectangular reference mark of predetermined length and width on said object,
repeatedly scanning said object with a camera having a scanning field along successive lines parallel to said mark length and spaced from each other in the direction of said mark width, said mark width being greater than twice the spacing between adjacent scan lines, said successive scanning of said lines being at a specified line scan rate,
generating in response to said scanning a) a video output signal representing sensible material on said object, including at least said mark, transduced by said camera during said scanning, b) successive line sync signals synchronized with scans of successive lines of said field, and c) successive field sync signals synchronized with successive scans of said field,
generating clock signals at a rate substantially in excess of said specified line scan rate,
processing said video, clock and line sync signals for detecting traversal of said mark during scanning of a line and producing a mark traversal signal,
processing said field sync signals and said mark traversal signals occurring during scanning of a field for detecting the presence of a mark in said field and generating a mark sensed signal correlated to a specified point within said mark,
processing said line sync, clock and mark sensed signals for generating a first actual coordinate position signal for said specified point of said mark in the direction of said mark length,
processing said line sync, field sync and mark sensed signals for generating a second actual coordinate position signal for said specified point of said mark in the direction of said mark width,
processing said first and second actual coordinate position signals for generating length-directed and width-directed repositioning signals correlated to the difference between said actual coordinate positions and desired coordinate positions, and
relatively repositioning said object and camera field in said length and width directions in response to said length-directed and width-directed repositioning signals to locate said specified point of said mark at said desired coordinate positions.

8. A method of positionally registering an object relative to a camera scanning field comprising the steps of:
placing a sensible rectangular reference mark of predetermined length and width on said object,
repeatedly scanning said object with a camera having a scanning field along successive lines parallel to said mark length and spaced from each other in the direction of said mark width, said mark width being greater than twice the spacing between adjacent scan lines, said successive scanning of said lines being at a specified line scan rate,
generating in response to said scanning a) a video output signal representing sensible material on said object, including at least said mark, transduced by said camera during said scanning, b) successive line sync signals synchronized with scans of successive lines of said field, and c) successive field sync signals synchronized with successive scans of said field,
generating clock signals at a rate substantially in excess of said specified line scan rate,
counting, under control of said video and line sync signals, clock signals occurring during scanning traversal of a mark in a single line and producing a mark traversal signal when said first counter reaches a specified clock count condition,
counting said mark traversal signals occurring during scanning of said field to determine the number of lines in which said mark was traversed during scanning of said field and generating a mark sensed signal when a specified mark traversal count condition is reached,
counting, under control of said mark sensed and line sync signals, clock signals for determining a first actual coordinate position of a specified point of said mark in the direction of said mark length, counting, under control of said field sync and mark sensed signals, line sync signals for determining a second actual coordinate position of said specified point of said mark in the direction of said mark width, comparing said actual coordinate position signals for generating length-directed and width-directed respositioning signals correlated to the difference between said actual coordinate positions and desired coordinate positions, and relatively repositioning said object and camera field in said length and width directions in response to said length-directed and width-directed repositioning signals to locate said specified point of said mark at said desired coordinate positions.

* * * * *

UNITED STATES PATENT OFFICE
CERTIFICATE OF CORRECTION

PATENT NO. : 3,870,814

DATED : March 11, 1975

INVENTOR(S) : Thomas H. Woods et al

It is certified that error appears in the above-identified patent and that said Letters Patent are hereby corrected as shown below:

Column 3, line 39, change "farming" to --forming--.

Column 5, line 5, change "mtor" to --motor--.

Column 7, line 16, change "transucing" to --transducing--.

Column 8, line 21, insert the word "an" between "includes" and "analog-to-digital".

Column 12, line 16, insert the number "107" between the words "And-gate" and "responsive".

Column 15, line 31, insert "clock" between the words "78" and "pulses".

Column 17, line 12, insert "lines" after the word "of" and delete "occurring during".

Signed and Sealed this

*eighteenth* Day of *November 1975*

[SEAL]

*Attest:*

RUTH C. MASON
*Attesting Officer*

C. MARSHALL DANN
*Commissioner of Patents and Trademarks*